(12) United States Patent
Johannes Sanders et al.

(10) Patent No.: US 6,325,452 B1
(45) Date of Patent: Dec. 4, 2001

(54) FOLDING ROOF FOR A VEHICLE

(75) Inventors: Joseph Petrus Johannes Sanders, Venlo; Renatus Arnoldus Teunissen, St. Anthonis, both of (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/491,252

(22) Filed: Jan. 26, 2000

(30) Foreign Application Priority Data

Jan. 27, 1999 (NL) .................................................... 1011154

(51) Int. Cl.$^7$ ................................. B60J 7/057; B60J 7/19
(52) U.S. Cl. .......................... 296/219; 296/223; 296/224
(58) Field of Search .................... 296/219, 224, 296/223

(56) References Cited

U.S. PATENT DOCUMENTS

| | | | |
|---|---|---|---|
| 1,950,371 | 3/1934 | Baier | 296/219 |
| 2,242,844 | 5/1941 | Baier et al. | 296/224 |
| 2,774,624 | 12/1956 | Lower . | |
| 3,002,785 | 10/1961 | Larche | 296/219 |
| 3,683,993 | 8/1972 | Perks | 296/224 |
| 3,759,568 | 9/1973 | Unruh | 296/98 |
| 4,134,611 | 1/1979 | Craven et al. | 296/224 |
| 4,647,106 * | 3/1987 | Furst | 296/223 |
| 4,664,436 * | 5/1987 | Eyb | 296/121 |
| 4,830,428 | 5/1989 | Masuda et al. | 296/219 |
| 4,877,285 * | 10/1989 | Huyer | 296/224 X |
| 5,018,783 | 5/1991 | Chamings et al. | 296/219 |
| 5,058,939 | 10/1991 | Miilu | 292/DIG. 5 |
| 5,203,605 | 4/1993 | Grimm et al. | 293/219 |
| 5,310,241 | 5/1994 | Omoto et al. | 296/219 |
| 5,540,475 | 7/1996 | Kersting et al. | 296/100 |
| 5,820,206 | 10/1998 | Smith | 296/219 |
| 6,027,162 | 2/2000 | Smith | 296/219 |

FOREIGN PATENT DOCUMENTS

| | | | |
|---|---|---|---|
| 201483 | 5/1930 | (CH) | 296/219 |
| 558031 | 8/1932 | (DE) . | |
| 643380 | 4/1937 | (DE) | 296/224 |
| 603834-A1 | 6/1994 | (EP) | 296/219 |
| 1003972 | 3/1952 | (FR) . | |
| 1345216 | 10/1963 | (FR) | 296/224 |
| 323065 | 12/1929 | (GB) | 296/224 |
| 1539906 | 2/1979 | (GB) | 296/219 |
| 2-208125 | 8/1990 | (JP) | 296/219 |
| WO 99/39932 * | 8/1999 | (WO) . | |

* cited by examiner

Primary Examiner—Dennis H. Pedder
(74) Attorney, Agent, or Firm—Westman, Champlin & Kelly, P.A.; S. Koehler

(57) ABSTRACT

A folding roof for a vehicle having an opening (2) in its fixed roof (1) comprises a stationary part (3) to be fixed to the roof, an adjustable cover (5) supported by said stationary part, which functions as the closure element. The cover is adjustable between a closed position, in which it closes the roof opening, and an open position, in which it releases the roof opening on the opening side. An operating beam (6) is provided on the opening side of the cover, on which cables (10) engage for adjusting the operating beam. A tensioning device (11) is mounted between said operating beam and said stationary part for tensioning the cover during the last part of the closing movement. The tensioning device can be operated by the cables and cooperates with a counter-element (17), which is adjustable in the direction of the movement of the operating beam. The counter-element, which is in the form of a block which is movable along said stationary part, is for example provided with a locking cavity (16) or the like for the tensioning device.

8 Claims, 9 Drawing Sheets

FOLDING ROOF FOR A VEHICLE

BACKGROUND OF THE INVENTION

The invention relates to a folding roof for a vehicle having an opening in a fixed roof.

The invention relates to a folding roof in accordance with the preamble of claim 1.

A folding roof of this kind is known, for example from the applicant's European patent application EP-A-0 765 771. A problem that occurs with this folding roof is that the dimension of the cover slightly changes, for example shrinks or stretches, in the course of time, and that it is subject to ageing due to climatic influences and the like, as a result of which the cover tension in the closed position will increase or decrease.

SUMMARY OF THE INVENTION

The object of the invention is to provide a folding roof of the kind referred to in the introduction, wherein the above problem is eliminated in an efficient manner.

The object of the invention is to provide a folding roof of the kind referred to in the introduction, wherein the above problem is eliminated in an efficient manner.

In order to accomplish that objective, the folding roof according to the invention is characterized in that the counter-element is adjustable in the direction of movement of the operating beam.

As a result, it is possible to adjust the tensioning device for the cover by adjusting the counter-element, as a result of which a possible change in the cover dimension can be compensated, so that the cover can permanently be pulled taut.

The invention will be discussed in more detail hereafter with reference to the drawing, which shows an embodiment of the folding roof according to the invention.

DETAILED DESCRIPTION OF THE ILLUSTRATIVE EMBODIMENTS

Figure 1:
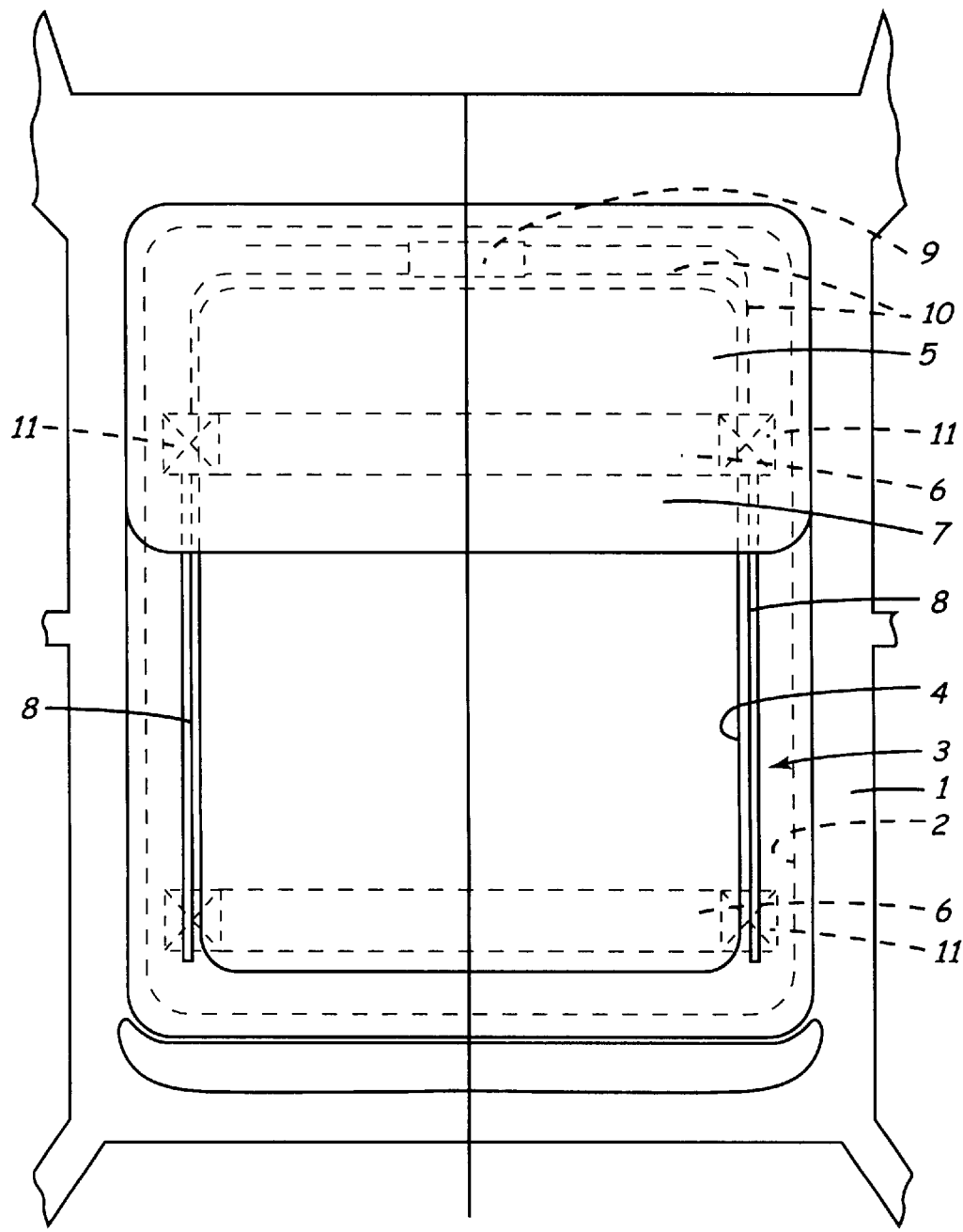
FIG. 1 is a schematic top plan of a vehicle roof fitted with the embodiment of the folding roof according to the invention.

The drawing, and in the first instance FIG. 1 thereof, shows a roof 1 of a vehicle, in this case a passenger car, which is provided with an opening 3 for accommodating a folding roof. The folding roof comprises a frame 3, which supports parts of the folding roof and which is arranged for mounting the folding roof in the fixed roof 1. Frame 3 bounds an opening 4, which can be selectively closed or at least partially released by a flexible cover 5. The construction of the flexible cover 5 and the means for folding same upon opening the roof may be of a prior art type and will not be discussed in more detail herein.

An operating beam 6 for operating the folding roof is provided, on the front side of said flexible cover 5 in this case, to which operating beam a covering plate 7 is attached, which is connected to flexible cover 5.

Operating beam 6 is guided in guide rails 8 with its lateral ends, which guide rails extend in the longitudinal direction of the vehicle along each side of opening 4. Operating beam 6 can be moved forwards and backwards by drive means, which comprise a driving element 9 in the form of a crank, an electric motor or the like, and connecting means 10 in the form of pressure-rigid driving cables or the like. Cables 10 drive the operating beam 6 directly during the larger part of the opening and closing movement of the folding roof. In order to be able to pull the flexible cover 5 nicely taut in the closed position, however, a transmission/mechanism 11 functioning as a tensioning device is mounted between cables 10 and operating beam 6, so as to pull the operating beam 6 with greater driving force to the closed and sealed position during the last part of the closing movement.

Said transmission mechanism 11 is described in detail in Dutch patent application No. 1008202. FIGS. 3–10 and the related description below correspond to the exemplary transmission mechanism of Dutch patent application No. 1008202.

Figure 2:
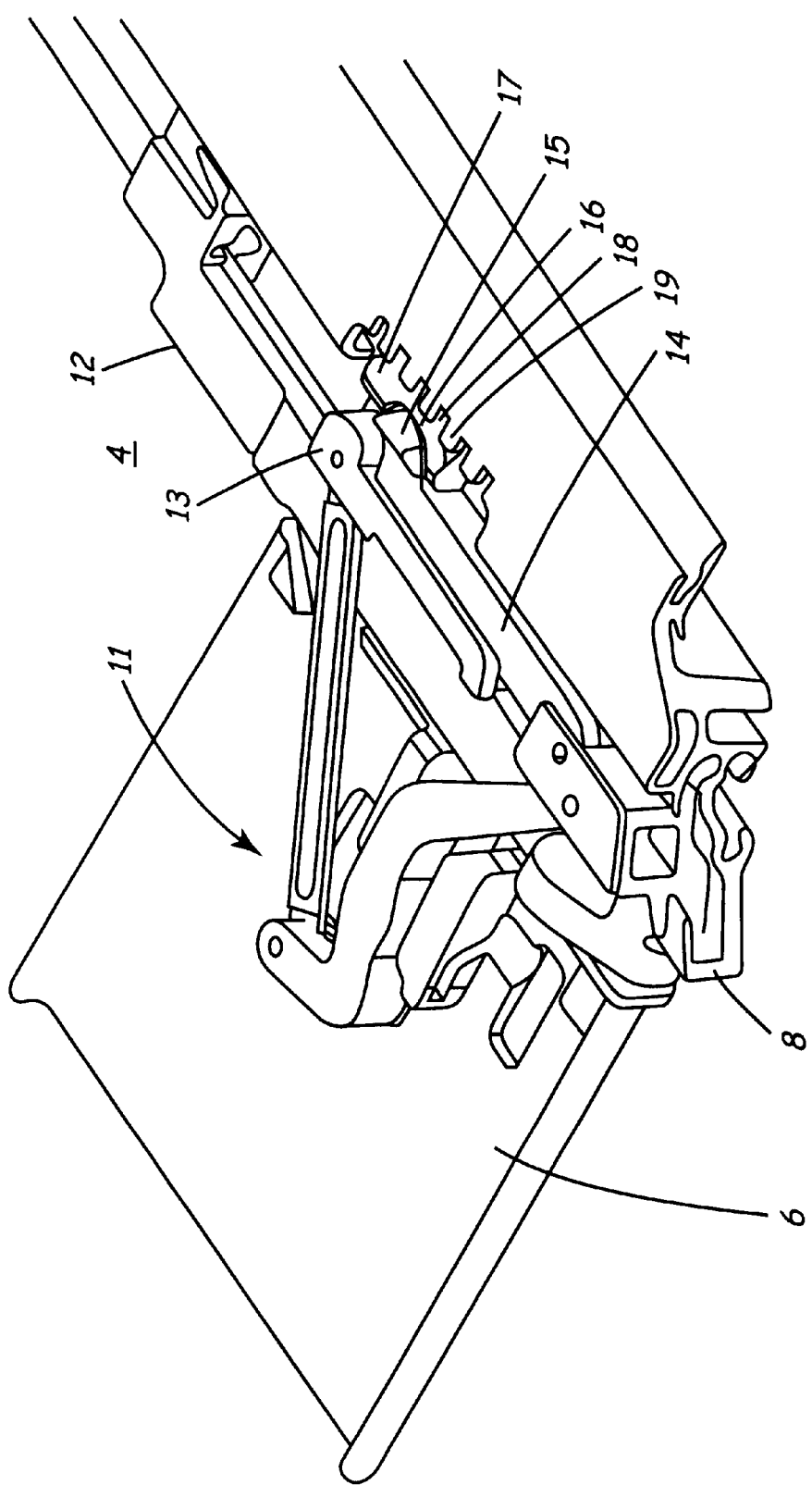
FIG. 2 is a larger-scale perspective view of a portion of FIG. 1.

FIG. 2 shows the transmission mechanism 11 and the parts that cooperate therewith, and a lateral end portion of the operating beam 6 can be distinguished, which is suspended from a driving slide 12 which is capable of forward and backward movement in guide rail 8 on the respective side of opening 4. A sub-slide 13, which is fixedly connected to the cable 10 (not shown), cooperates with said driving slide. Driving slide 12 and sub-slide 13 are coupled in such a manner that they move as one unit during the larger part of the opening and closing movement of the operating beam, whilst driving slide 12 is locked with respect to guide rail 8 during the final part of the closing movement and the first part of the opening movement, and sub-slide 13 moves relative to driving slide 12.

During said relative movement, sub-slide 13 drives the operating beam 6 via the transmission mechanism 11, which functions as the tensioning device in that case. A locking mechanism (not shown) couples the slides 12 and 13 together as one unit, and the locking engagement can be released by lateral movement of a push-off means 14, which is provided at its rear end with a locking element 15 in the form of a cam, which is capable of engaging in a locking cavity 16. This enables the transmission mechanism 11 to push off with respect to the frame so as to provide additional tensioning force for tensioning the cover.

Locking cavity 16 is formed in a counter-element, in this embodiment consisting of a block 17 which is movable in the longitudinal direction of the guide rail 8. The position of locking cavity 16 along guide rail 8 is adjustable in this manner, as a result of which the starting point of the tensioning movement can be changed. In case of a change in the cover dimension, locking cavity 16 can be moved in the longitudinal direction of guide rail 8, as a result of which the end position of the normal movement of the operating beam 6 can be adapted to the desired final cover tension. The special tensioning movement will start sooner or later in that case. The total movement of the operating beam 6 between the open position and the closed position will be variable then. Shrinkage or stretch of the cover can be compensated for in this manner.

The adjustability of the counter-element 17 may be realized in various manners. In the illustrated embodiment, counter-element 17 is provided with teeth 18 on the side remote from operating beam 6, whilst guide rail 8 is provided with teeth 19, whereby teeth 18 can be meshed with teeth 19 in different positions, for example by sliding teeth 18 into teeth 19 from above at different locations. Thus, the counter-element 17 can be mounted and locked in a number of different discrete positions in longitudinal direction. The adjustment can be carried out in a simple manner, for example when the vehicle is being serviced. All kinds of other continuous or discrete adjustments of the counter-element 17 are possible, of course. Also a change in the length of the locking element 15 would provide the same result, for example. Also in this case the point of engagement of the tensioning device on a part that remains stationary during tensioning will change.

An exemplary embodiment of transmission mechanism 11 will now be explained. FIGS. 3–7 show said transmission mechanism 11 and the parts that co-operate therewith. The lateral end portion of operating beam 6 can be distinguished, which is supported, in a manner yet to be shown, in a driving slide 12 which is capable of reciprocating movement in guide rail 8 on the respective side of passage opening 4. The subslide 13 comprising an engaging point 20 for the cables 10 (not shown) co-operates with said driving slide 12. Driving slide 12 and subslide 13 are interconnected in such a manner that they move as a unit during the larger part of the opening and closing movement, while driving slide 12 is locked with respect to guide rail 8 and subslide 13 moves with respect to driving slide 12 during the final part of the closing movement and the first part of the opening movement, whereby subslide 13 drives the operating beam 6 via transmission mechanism 11 during said movement relative to each other.

Figure 7:
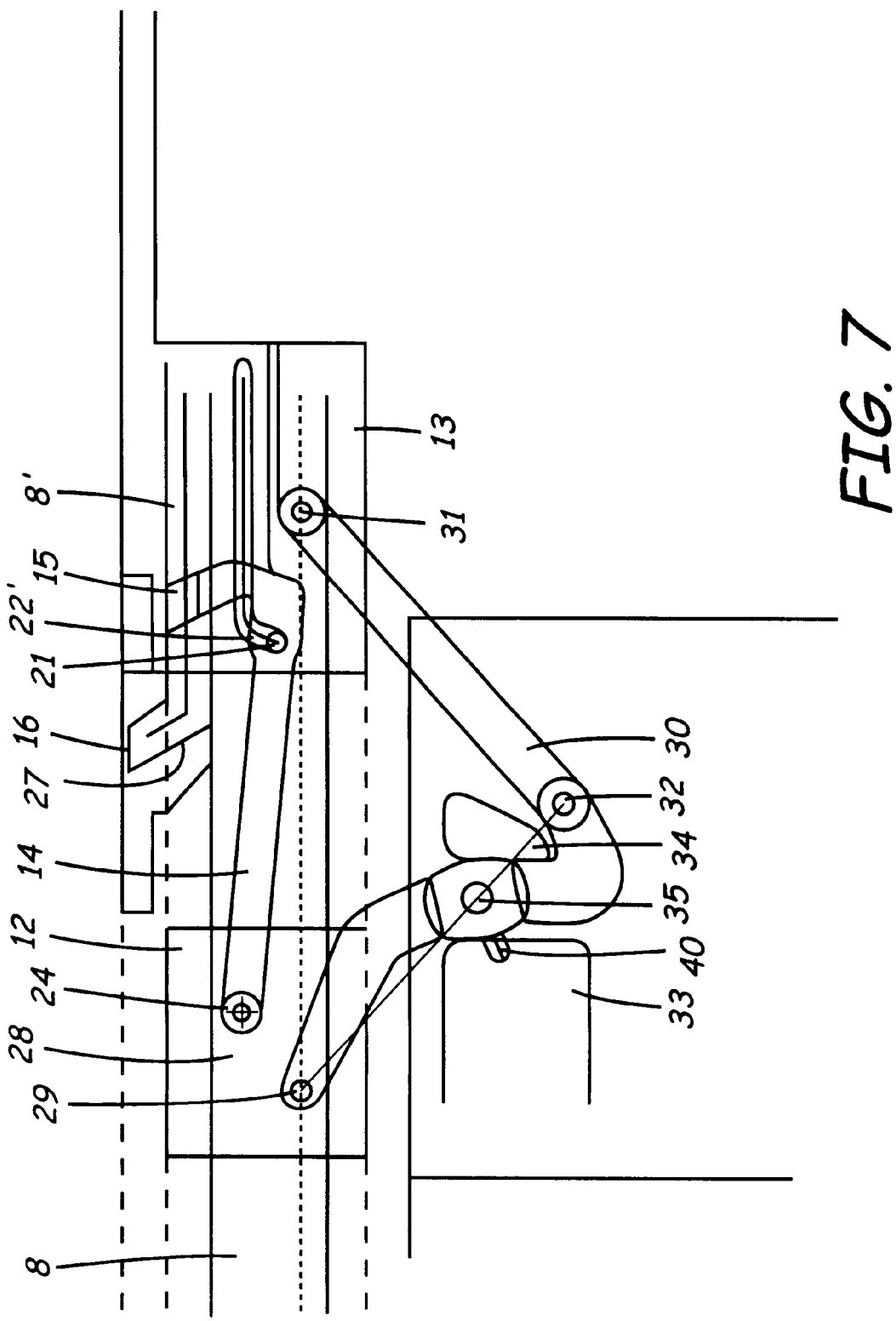
FIG. 7–10 are views of that which is shown in FIG. 6, showing four different positions thereof.

A locking element in the form of a pin 21 which engages in an oblique slot portion 22' of a slot 22 in subslide 13 is provided for the purpose of interconnecting slides 12 and 13 as a unit. Pin 21 is provided near the free ends of an arm 14 which is pivotally connected to driving slide 12 by means of a vertical pivot 24. While driving slide 12 and subslide 13 are fixedly interconnected, pin 21 is positioned at the end of the oblique slot portion of slot 22 while arm 14 is prevented from pivoting about pivot 24 by a cam or nose 15 provided on the free end of arm 14, which abuts against a flange 8' of guide rail 8 (FIG. 7). Thus, driving slide 12 and subslide 13 are rigidly interconnected in a longitudinal direction.

The locking engagement by locking element 21 can be released by means of the cam 15 that is present on the free end of arm 14, which cam 15 can enter into the cavity 16 formed in guide rail 8. Cam 15 is forced into cavity 16 by a catch element 27 projecting into the path of cam 15, which catches cam 15 and, because of its sloping position, guides said cam into cavity 16. Another effect of said sloping position is that the driving slide 12 which is connected to arm 14 is gradually stopped, because the cam 15 present on arm 14 continues to move forward slightly, and driving slide 12 will not come to a standstill until cam 15 fully engages in cavity 16, therefore. In this manner, the driving slide 12 is prevented from slamming to a standstill.

The lateral movement of arm 14 caused by cam 15 engaging into cavity 16 not only locks driving slide 12 in position with respect to guide rail 8, but it also causes the locking engagement between driving slide 12 and subslide 13 to be released, since the pin 21 present on arm 14 moves from the oblique slot portion 22' into the slot portion 22" (FIG. 8), that extends in the longitudinal direction of guide rail 8, as a result of which subslide 13 can move relative to driving slide 12, due to the fact that pin 21 has moved into slot portion 22". Arm 14 comprising cam 15 thus functions as a releasing element for locking element/pin 21, and also as locking element for driving slide 12, and thus as a push-off element for transmission mechanism 11. That is, the engagement between cam 15 and cavity 16 makes it possible to transmit the required push-off force to guide rail 8 via cam 15, which enables the transmission mechanism 11 to produce a speed-reducing and thus force-increasing effect.

The transmission mechanism 11 comprises a triangular construction with a first leg 28, which is pivotally connected to driving slide 12 by means of a vertical pivot 29, and a second leg 30, which is pivotally connected to subslide 13 by means of a vertical pivot 31. Legs 28 and 30 are pivoted together by means of a pivot 32 at their ends remote from pivots 29, 31. In this manner, a triangular construction having a variable base is formed, because vertical pivot 31 on subslide 13 is capable of movement with respect to pivot 29 on driving slide 12. Movement of subslide 13 with respect to driving slide 12 thus causes the triangle to change its form, to the effect that the angle between legs 28 and 30 will be changed and the top of the triangle will shift relative to the angular point formed by pivot 29.

The triangular construction of the transmission mechanism 11 is in driving engagement with operating beam 6 in that first leg 28 is accommodated between upright walls 33 and 34 on operating beam 6, between which walls 33 and 34 first leg 28 extends in abutting relationship therewith. The shape of leg 28 is thereby such that the points of engagement between first leg 28 and walls 33, 34 can move in a direction transversely to guide rails 8 while the triangular construction is changing its form, so as not to oppose said deformation. An imaginary line through the points of engagement between first leg 28 and walls 33 and 34 intersects the imaginary line between pivots 29 and 32 in constantly the same point of intersection 35, at least approximately so. Said imaginary line between the points of engagement of first leg 28 to walls 33 and 34 constantly extends parallel to guide rail 8 thereby. This gives the transmission great stability.

The transmission ratio of transmission mechanism 11 can be selected and varied during the design phase by varying the dimensions of the triangular construction and suitably selecting the point of engagement between the triangular construction and the operating beam 6. In the illustrated embodiment, the triangle of the triangular construction is an isosceles triangle, since the distance between pivots 29 and 32 of first leg 28 equals the distance between pivots 31 and 32 of second leg 30. In principle, the effective lengths of legs 28 and 30 may also be mutually divergent.

Figure 3:
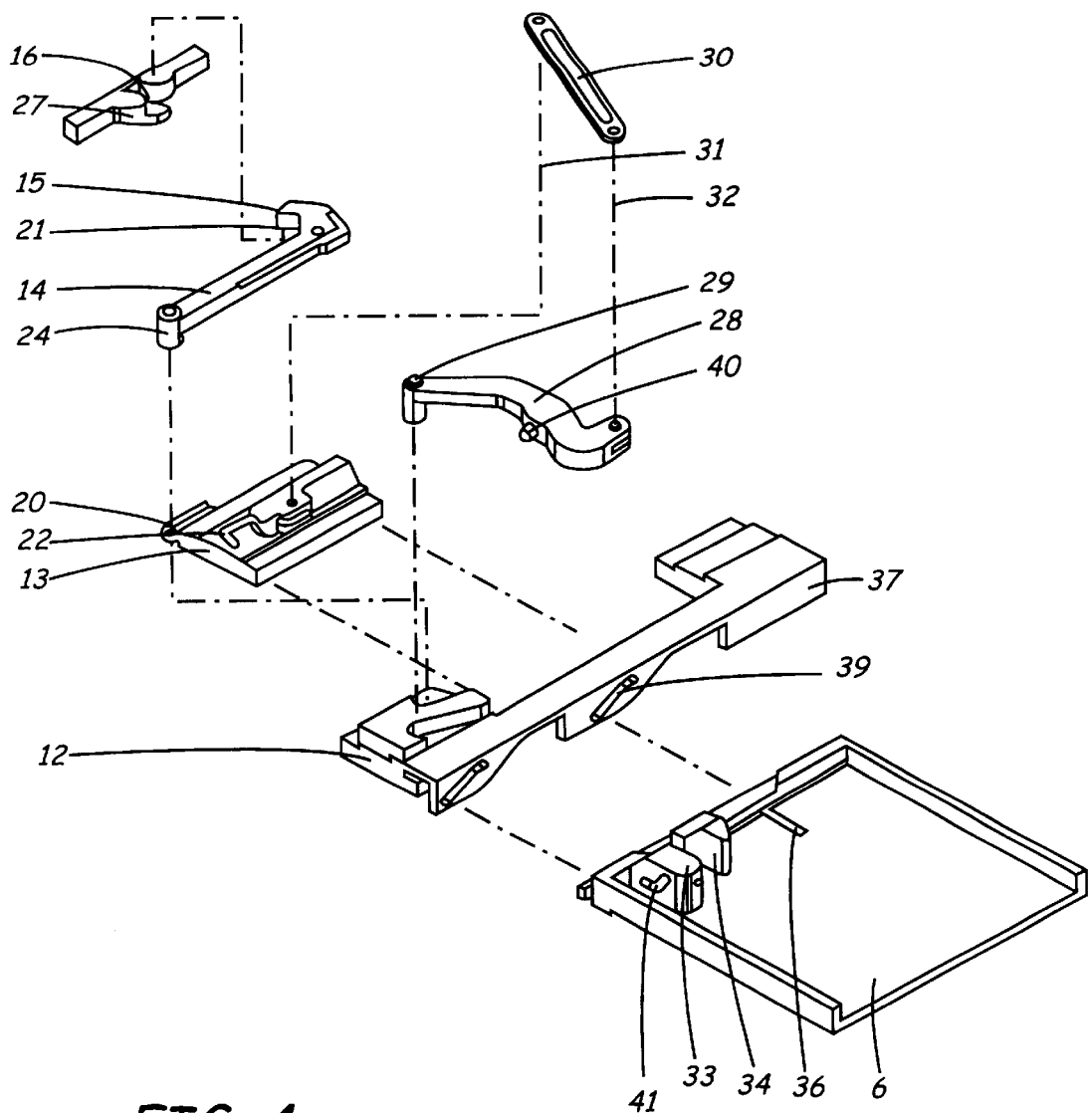
FIG. 3 is a larger-scale, perspective exploded view of an exemplary transmission mechanism for operating the folding roof.
Figure 4:
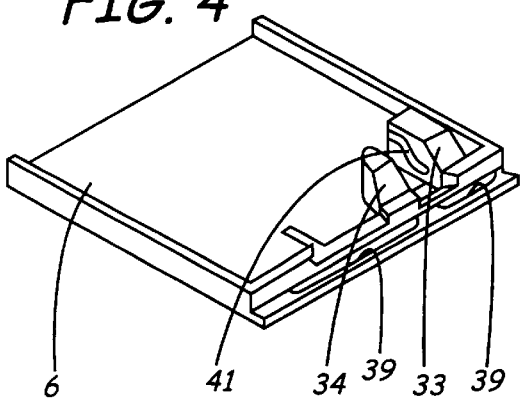
FIG. 4 shows the part of the control beam of FIG. 3 in a position turned 180° about a vertical axis.
Figure 5:
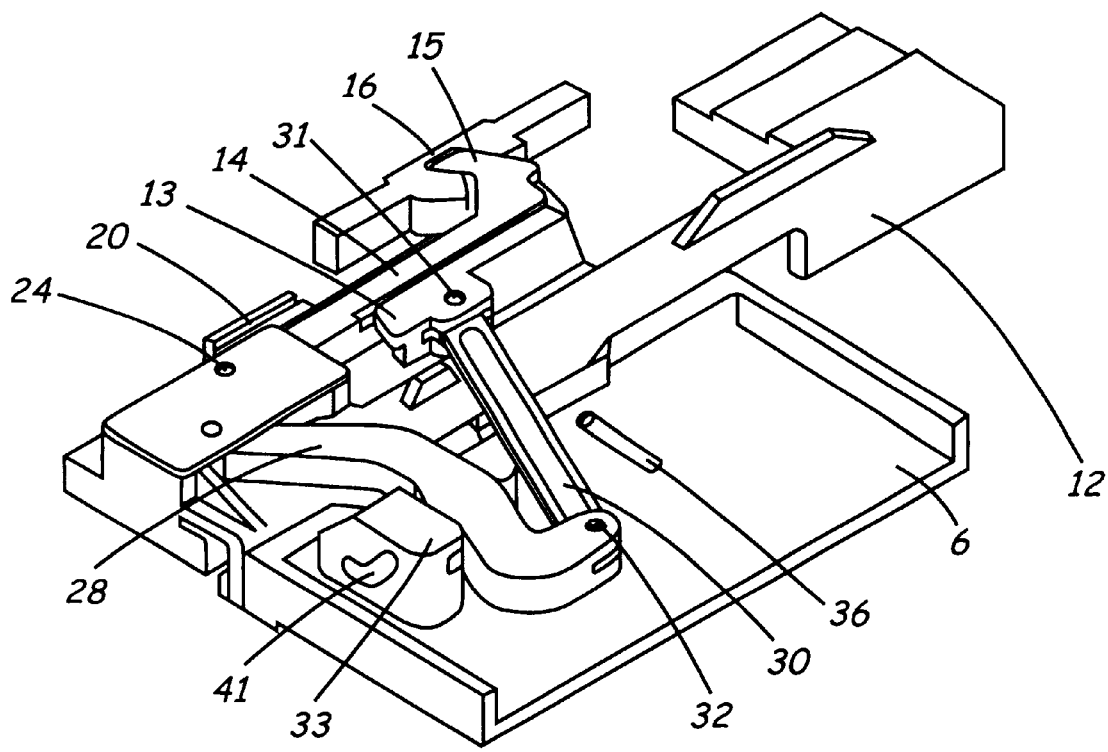
FIG. 5 is a larger-scale view of the parts shown in FIG. 3, but in assembled condition.
Figure 6:
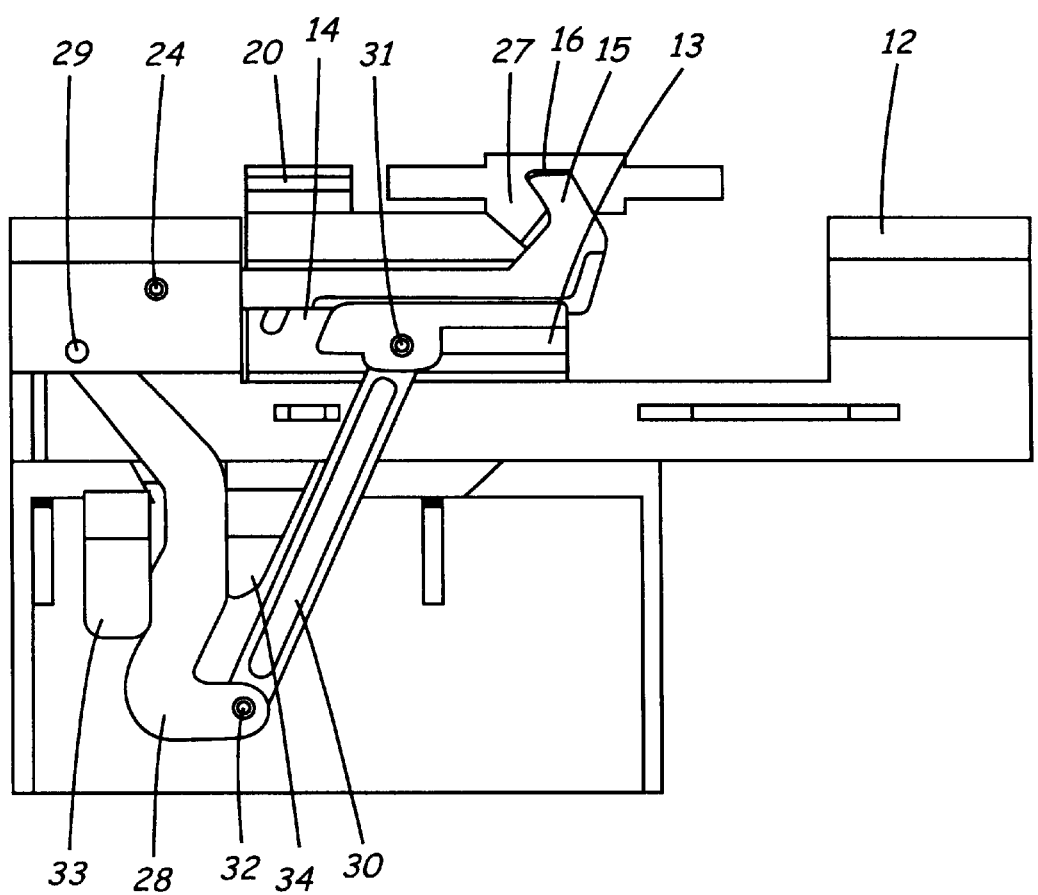
FIG. 6 is a plan view of that which is shown in FIG. 5.

As already mentioned before, operating beam 6 is connected to driving slide 12 in a vertically adjustable manner. This is done in order to move cover plate 7, which is fixedly connected to operating beam 6 in the present embodiment, in vertical direction during the final part of the closing movement and the first part of the opening movement, so as to have cover plate 7 move into sealing engagement with a mating sealing surface on frame 3 of the folding roof when the folding roof is being closed. The connection between the operating beam 6 and the respective driving slide 12 takes place via pin-slot connections comprising pins which are secured to operating beam 6 (only cavities 36 for receiving the pins are shown in the drawing of FIGS. 2 and 3) and slots 38 which are formed in a flange 37 of driving slide 12, which extends downwards along the inner side of guide rails 8. Slots 38 comprise horizontal locking portions at their ends and an oblique portion extending therebetween, which functions to adjust operating beam 6 in vertical direction during the movement of operating beam 6 with respect to driving slide 12 when transmission mechanism 11 is operative. Accordingly, the vertical adjustment of operating beam 6 and of cover plate 7 is controlled by the transmission mechanism 11 of the driving mechanism. Operating beam 6 is locked in position with respect to driving slide 12, in the direction transversely to the guide rails, because the portions of flange 37 in which slots 38 are present engage in openings 39 in the side wall of operating beam 6 (see FIG. 3) in a vertically adjustable manner.

The movement in vertical direction of operating beam 6 with respect to leg 28 of the triangular construction is made possible in that first leg 28 is in engagement with the front upright wall 33 via a pin-slot connection comprising a pin 40 which is formed on first leg 28 and a partially obliquely extending slot 41 which is formed in wall 43. Said slot therefore makes it possible for leg 28 to be supported in vertical direction and for operating beam 6 and front leg 28 to move in lateral direction and in vertical direction relative to each other.

FIGS. 7–10 illustrate the operation of the driving mechanism and of the transmission mechanism 11 for operating beam 6.

FIGS. 7 illustrates the position of transmission mechanism 11 wherein operating beam 6 is driven directly by the cables 10. The base of the triangular construction between pivots 29 and 31 is locked thereby, because driving slide 12 and subslide 13 are interconnected as a unit. This has been effected by means of a pin 21 which acts as a locking element, which pin engages in the oblique slot portion 22 of the subslide, while the arm 14 on which pin 21 is present abuts against a flange of the guide rail 8 via cam 21 on arm 14. Transmission mechanism 11 will remain inoperative as long as arm 14 is prevented from making a pivoting movement, so that a direct transmission will be effected via the rigid triangular construction.

Figure 8:
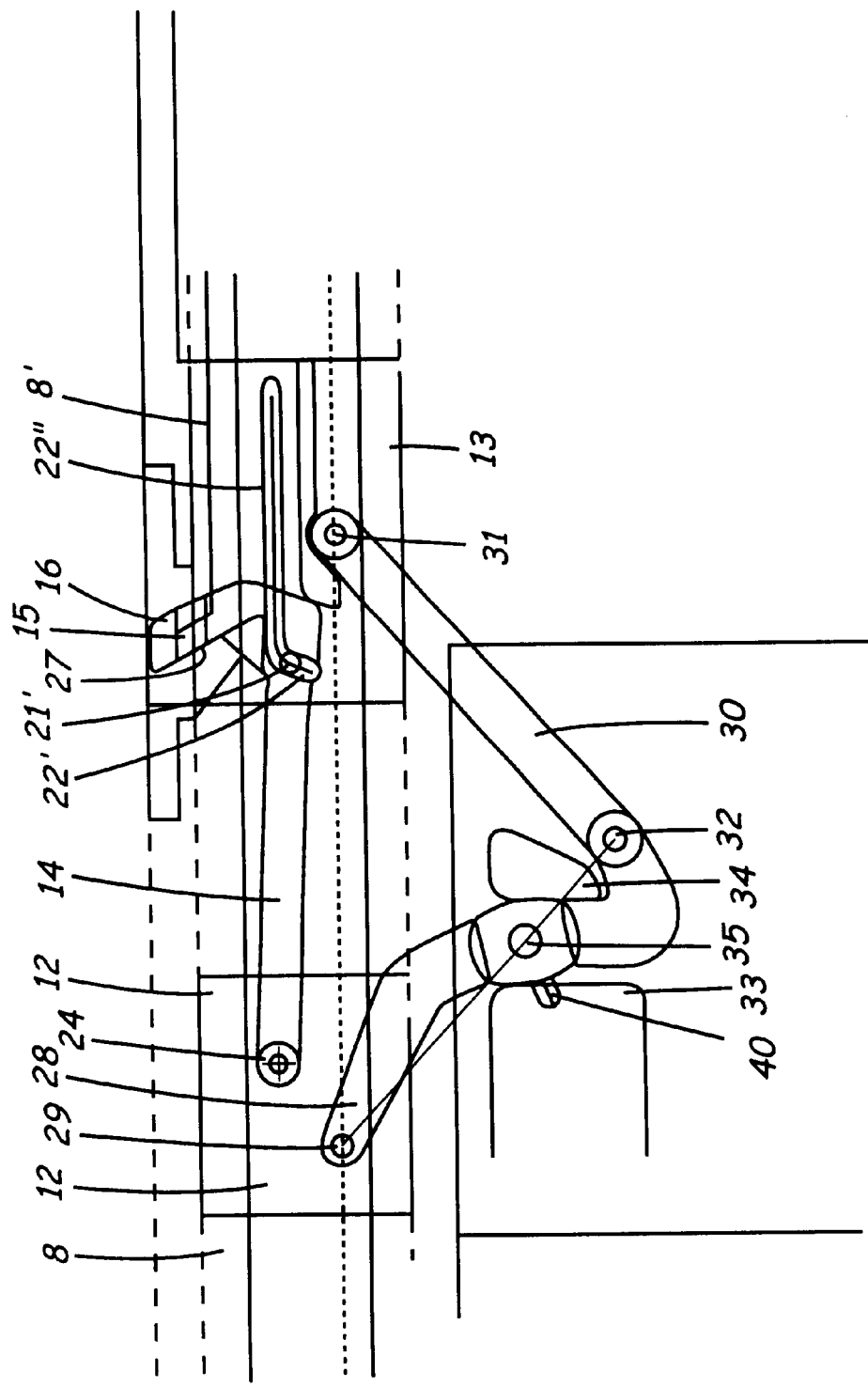
Figure 9:
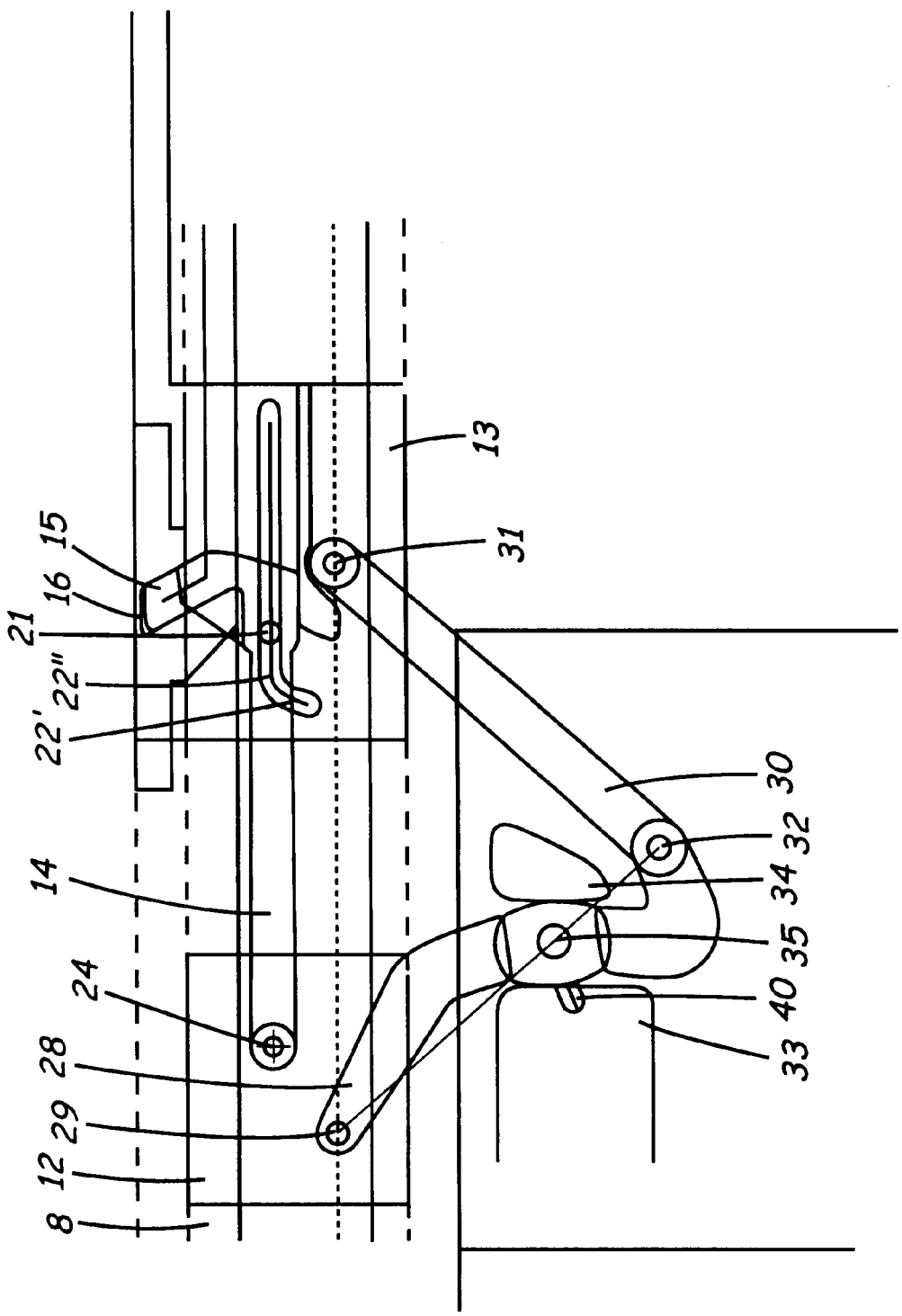

FIG. 8 shows the position of operating beam 6 of the folding roof, wherein subslide 13 has been moved so far to the front by the cable 10 in question that cam 15 on arm 14 hooks behind catch element 27 of guide rail 8, and cam 15 is forced into cavity 16 as a result of the sloping configuration of catch element 27. As a result of this lateral movement of cam 15, arm 14 will pivot about pivot 24, causing pin 21 near cam 15 on arm 14 to move through oblique slot portion 22' in the direction of parallel slot portion 22".

FIG. 8 shows the position in which cam 15 fully engages in cavity 16, and in which pin 21 on arm 14 has reached slot portion 22'. As soon as pin 21 has landed in said slot portion 22', cam 15 is locked in position in cavity 16 in that arm 14 is prevented from pivoting about pivot 24 as a result of pin 21 engaging in slot portion 22'. on the other hand, movement of subslide 13 with respect to driving slide 12 is allowed in this position, in that pin 21 enables subslide 13 to move with respect to driving slide 12 as a result of the relative movement between pin 21 and slot portion 22'. Since driving slide 12 is locked in position via arm 14 as a result of cam 15 engaging in cavity 16, subslide 13 will start to move with respect to driving slide 12 when an additional driving force is exerted via cable 10. Pivot 31 of second leg 30 is moved with respect to pivot 29 of first leg 28 thereby, causing the triangle made up of legs 28 and 30 to change its form and first leg 28 to make a pivoting movement about pivot 29. This pivoting movement produces a component of motion of point of intersection 35 on first leg 28 in a direction parallel to guide rail 8, which results in movement of operating beam 6 via upright wall 34. The magnitude of the movement of operating beam 6 as compared to the movement of subslide 13 depends on the dimensions of the triangular construction.

Figure 10:
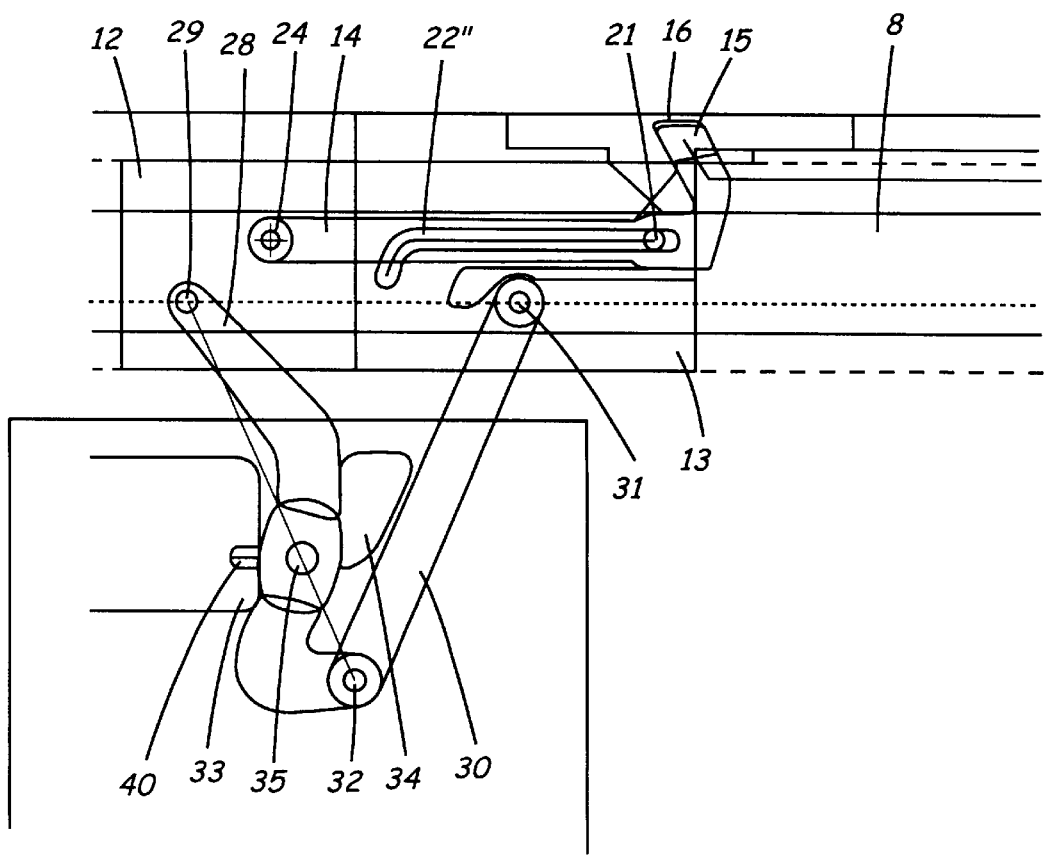

In FIG. 10, the folding roof occupies its most forward, entirely closed and sealed position, in which subslide 13 has reached its most forward position. In this position, first leg 28 is in engagement with the upright walls 34 and 35 of operating beam 6 in such a manner that a force being exerted on leg 28 from operating beam 6 as a result of the stretching force in cover 5 is absorbed properly by legs 22 and 24, subslide 13 and eventually cables 10 and driving element 9. Operating beam 6 is thus locked in its most forward position by the retaining force which is exerted by the cables and the driving element, which retaining force is increased by the transmission from transmission mechanism 11.

The opening of the folding roof takes place in the reverse manner, so that a more detailed description thereof need not be provided.

From the foregoing it will be apparent that the invention provides a folding roof which ensures that, also in the long run, the cover will remain taut in the closed position.

The invention is not restricted to the above-described embodiment as shown in the drawing, which can be varied in several ways without departing from the scope of the invention.

What is claimed is:

1. A folding roof for a vehicle having an opening in its fixed roof, comprising:
    a stationary part to be fixed to the roof;
    an adjustable cover supported by said stationary part, which functions as a closure element, which cover is supported by said stationary part and which is adjustable between a closed position, in which it closes the roof opening, and an open position, in which it releases the roof opening on an opening side;
    an operating beam provided on the opening side of the cover;
    a driving element for adjusting the operating beam; and
    a tensioning device carried by said operating beam for tensioning the cover during the last part of a closing movement, said tensioning device operable by said driving element and cooperating with a counter-element, said counter-element being adjustable in a direction of movement of the operating beam.

2. The folding roof according to claim 1, wherein the counter-element is adjustably supported by said stationary part.

3. The folding roof according to claim 1, wherein said counter-element can be locked in several discrete positions.

4. The folding roof according to claim 3, wherein said tensioning device includes a push-off means provided with a locking element, while said counter-element, which is in the form of a block which is movable along said stationary part, is provided with a locking cavity.

5. The folding roof according claim 4, wherein said push-off means including the locking element is mounted on a slide which is guided in a guide rail of said stationary part, and wherein an unlocking mechanism activates the tensioning device upon locking of the locking element.

6. The folding roof according to claim 1, wherein said stationary part and said counter-element comprise teeth, by means of which said counter-element can be moved to various positions with respect to said stationary part.

7. The folding roof according to claim 1, wherein said tensioning device is fitted with a linkage functioning as a transmission mechanism supported on the counter-element on which the driving element engages, which is connected to the operating beam in such a manner that the operating beam is moved at a reduced speed upon movement of the driving element.

8. A folding roof for a vehicle having an opening in its fixed roof, comprising:

a stationary part to be fixed to the roof;

an adjustable cover as a closure element, which is supported by said stationary part and which is adjustable between a closed position, in which is closes the roof opening, and an open position, in which it releases the roof opening on the opening side;

an operating beam provided on the opening side of the cover and being adapted to move;

a driving element for adjusting the operating beam; and a tensioning device carried by the operating beam for tensioning the cover during the last part of the closing movement, said tensioning device being able to be operated by said driving element and which, during said tensioning, engages an element which is connected to said stationary part, said element being adjustable in a direction of movement of the operating beam.

* * * * *